(12) United States Patent
Chen et al.

(10) Patent No.: US 11,412,500 B2
(45) Date of Patent: Aug. 9, 2022

(54) METHOD, APPARATUS AND DEVICE FOR SENDING A CONTROL CHANNEL, METHOD, APPARATUS AND DEVICE FOR DETECTING A CONTROL CHANNEL, AND STORAGE MEDIUM

(71) Applicant: ZTE CORPORATION, Shenzhen (CN)

(72) Inventors: Yijian Chen, Shenzhen (CN); Zhaohua Lu, Shenzhen (CN); Fusheng Zhu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 43 days.

(21) Appl. No.: 16/980,314

(22) PCT Filed: Mar. 13, 2019

(86) PCT No.: PCT/CN2019/077950
§ 371 (c)(1),
(2) Date: Sep. 11, 2020

(87) PCT Pub. No.: WO2019/174593
PCT Pub. Date: Sep. 19, 2019

(65) Prior Publication Data
US 2021/0092718 A1    Mar. 25, 2021

(30) Foreign Application Priority Data
Mar. 13, 2018  (CN) .......................... 201810206077.2

(51) Int. Cl.
*H04W 72/04* (2009.01)
(52) U.S. Cl.
CPC ................. *H04W 72/042* (2013.01)
(58) Field of Classification Search
CPC .................................................. H04W 72/042
See application file for complete search history.

(56) References Cited

U.S. PATENT DOCUMENTS

2005/0207335 A1* 9/2005 Schmidl ................ H04L 1/1845
2013/0083751 A1  4/2013 Papasakellariou et al.
(Continued)

FOREIGN PATENT DOCUMENTS

CN    101478808 A    7/2009
CN    102752070 A    10/2012
(Continued)

OTHER PUBLICATIONS

International Search Report for Application No. PCT/CN2019/077950, dated May 29, 2019, 4 pages.
(Continued)

*Primary Examiner* — Ronald B Abelson
(74) *Attorney, Agent, or Firm* — Morgan, Lewis & Bockius LLP

(57) ABSTRACT

Provided are a method, an apparatus and a device for sending a control channel, a method, an apparatus and a device for detecting a control channel, and a storage medium. The method for sending a control channel includes that a sending end sends a first control channel using a first transmission configuration, the first control channel carrying first control information for indicating transmission configuration information of a data channel and that the sending end sends a second control channel using a second transmission configuration, the second control channel carrying second control information for indicating transmission configuration information of the data channel.

13 Claims, 3 Drawing Sheets

---

1010
A sending end sends a first control channel using a first transmission configuration, where the first control channel carries first control information for indicating transmission configuration information of a data channel 1020
The sending end sends a second control channel using a second transmission configuration, where the second control channel carries second control information for indicating transmission configuration information of the data channel

(56) References Cited

U.S. PATENT DOCUMENTS

2016/0374058 A1 12/2016 Dinan
2017/0264412 A1* 9/2017 Chen .................. H04L 5/0048

FOREIGN PATENT DOCUMENTS

| CN | 103857041 | A | 6/2014 |
| CN | 103891162 | A | 6/2014 |
| CN | 104247313 | A | 12/2014 |
| CN | 106712914 | A | 5/2017 |
| CN | 107113136 | A | 8/2017 |
| CN | 107396443 | A | 11/2017 |
| JP | 2005525065 | A | 8/2005 |
| WO | WO-2017194022 | A1 | 11/2017 |

OTHER PUBLICATIONS

Chinese Office Action for Application No. 201810206077.2, dated May 27, 2021, 23 pages including translation.
Huawei, R1-2009340 "Summary #1 of email discussion [103-e-NR-L1enh-URLLC-02] on remaining issues on DCI format design", 3GPP TSG RAN WG1 Meeting #103-e E-meeting, Oct. 26-Nov. 13, 2020, 35 pages.
Chinese Supplemental Search Report for Application No. 2018102060772, dated Dec. 13, 2021, 2 pages including translation.
Extended European Search Report for Application No. 19766508.6, dated Nov. 10, 2021, 11 pages.
Huawei, et al., "DCI contents in NR and two-stage DCI designs", 3GPP Draft; R1-1706949, 3rd Generation Partnership Project (3GPP), Mobile Competence Centre ; 650, Route Des Lucioules ; F-06921 Sophia-Antipolis Cedex ; FRANCE, vol. RAN WG1, No. Hangzhou, China; May 15, 2017-May 19, 2017 May 14, 2017 (May 14, 2017), XP051272179, Retrieved from the Internet: URL:http://www.3gpp.org/ftp/Meetings_3GPP_SYNC/RAN1/Docs/[retrieved on May 14, 2017].

* cited by examiner

METHOD, APPARATUS AND DEVICE FOR SENDING A CONTROL CHANNEL, METHOD, APPARATUS AND DEVICE FOR DETECTING A CONTROL CHANNEL, AND STORAGE MEDIUM

CROSS-REFERENCE TO RELATED APPLICATIONS

This is a National Stage Application, filed under 35 U.S.C. 371, of International Patent Application No. PCT/CN2019/077950, filed on Mar. 13, 2019, which claims priority to Chinese Patent Application No. 201810206077.2 filed Mar. 13, 2018, contents of both of which are incorporated herein by reference in their entireties.

TECHNICAL FIELD

The present disclosure relates to the field of communications, for example, to a method, an apparatus and a device for sending a control channel, a method, an apparatus and a device for detecting a control channel, and a computer-readable storage medium.

BACKGROUND

In the 5th generation mobile communication technology (5G), a control channel in a physical layer is a very precious resource, and the resource utilization rate of the control channel is an important factor affecting the transmission efficiency of a system. In the related art, the resource utilization rate of the control channel is low and needs to be improved.

SUMMARY

The present disclosure provides a method, an apparatus and a device for sending a control channel, a method, an apparatus and a device for detecting a control channel, and a computer-readable storage medium, so as to improve a resource utilization rate of the control channel.

The present disclosure provides a method for sending a control channel, the method includes steps described below.

A sending end sends a first control channel using a first transmission configuration, where the first control channel carries first control information for indicating transmission configuration information of a data channel.

The sending end sends a second control channel using a second transmission configuration, where the second control channel carries second control information for indicating transmission configuration information of the data channel.

The present disclosure provides an apparatus for sending a control channel, the apparatus includes a configuration information acquisition unit and a sending unit.

The configuration information acquisition unit is configured to acquire a first transmission configuration and a second transmission configuration.

The sending unit is configured to send a first control channel using the first transmission configuration, and send a second control channel using the second transmission configuration; where the first control channel carries first control information for indicating transmission configuration information of a data channel; and the second control channel carries second control information for indicating transmission configuration information of the data channel.

The present disclosure provides a device for sending a control channel, and the device includes a memory and a processor, where the memory stores a program which, when read and executed by the processor, implements the method for sending the control channel described above.

The present disclosure provides a computer-readable storage medium. The computer-readable storage medium stores at least one program executable by at least one processor to implement the method for sending the control channel described above.

The present disclosure provides a method for detecting a control channel, the method includes steps described below.

A receiving end detects a first control channel using a first transmission configuration, and acquires first control information from the first control channel, where the first control information indicates transmission configuration information of a data channel.

The receiving end detects a second control channel using a second transmission configuration, and acquires second control information from the second control channel, where the second control information indicates transmission configuration information of the data channel.

The present disclosure provides an apparatus for detecting a control channel, the apparatus includes a configuration information acquisition unit and a detection unit.

The configuration information acquisition unit is configured to acquire a first transmission configuration and a second transmission configuration.

The detection unit is configured to detect a first control channel using the first transmission configuration, acquire first control information from the first control channel, detect a second control channel using the second transmission configuration, and acquire second control information from the second control channel; where the first control information indicates transmission configuration information of a data channel, and the second control information indicates transmission configuration information of the data channel.

The present disclosure provides a device for detecting a control channel, the device includes a memory and a processor, the memory stores a program which, when read and executed by the processor, implements the method for detecting the control channel described above.

The present disclosure provides a computer-readable storage medium. The computer-readable storage medium stores at least one program executable by at least one processor to implement the method for detecting the control channel described above.

DETAILED DESCRIPTION

Figure 1:
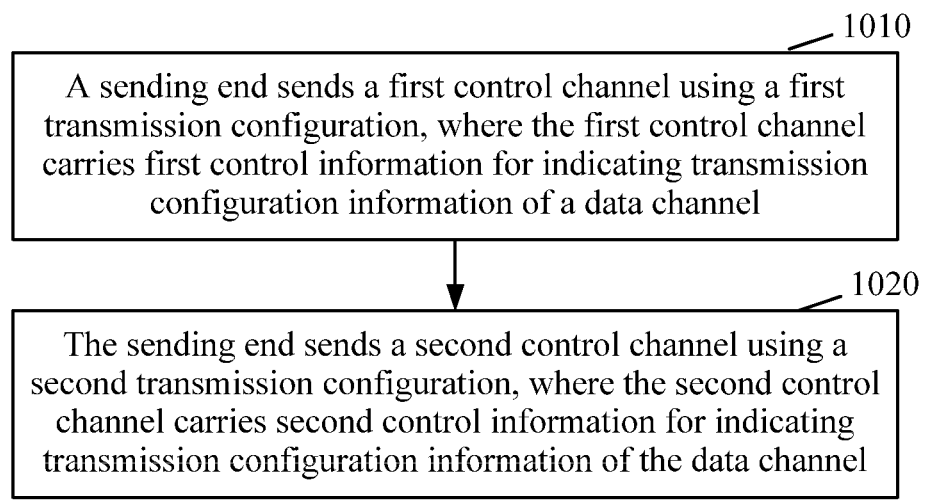
FIG. 1 is a flowchart of a method for sending a control channel according to an embodiment.

The embodiments of the present disclosure will be described hereinafter in conjunction with the drawings.

The steps illustrated in the flowcharts among the drawings may be performed by, for example, a computer system capable of executing a set of computer-executable instructions.

In the related art, a resource utilization rate of a control channel is low and not very ideal, which is embodied in aspects described below.

1. Different Physical Layer Control Information is Sent Using the Exactly Same Transmission Configuration with Low Efficiency.

Various physical layer control signaling in 5G includes resource allocation information, a carrier indication, a bandwidth part (BWP) indication, an indication of a trigger for reporting aperiodic channel state information (CSI), an uplink power control command, hybrid automatic repeat request (HARD) information, a demodulation reference signal (DMRS) configuration indication, an indication of a modulation and coding scheme (MCS), a trigger of a measurement pilot (such as a channel state information reference signal (CSI-RS) and a sounding reference signal (SRS)), a physical resource block (PRB) bundling parameter, an indication of a quasi-co-location (QCL) relationship, a precoding indication, etc.

Regardless of downlink control information (DCI) formats used for an uplink transmission or a downlink transmission, multiple types of information among these signaling are contained in a same DCI format for transmissions. In fact, these physical layer control signaling has a stricter requirement on an error rate than data information. When different control information is sent, the exactly same configuration of transmission parameters, such as a code rate, an MCS, a beam, power, a mapping mode, is used, which results in insufficient efficiency.

2. Poor Configuration Flexibility of a Control Channel Resource Set (CORESET) Leads to a Waste of Resources.

When DCI is sent in the control channel, a user equipment (UE) needs to perform a blind detection to determine information, such as whether the DCI exists, a position of the DCI, and a size of an occupied resource, etc. Therefore, it is necessary to pre-configure the CORESET of the control channel and define a search space in the resource set. In the related art, a size and a position of the CORESET cannot be dynamically adjusted through the physical layer signaling and can only be semi-statically adjusted through the higher layer signaling. The CORESET is generally shared by many users. If the CORESET is configured to be too small, sometimes the users will have insufficient control resources. Therefore, the configured CORESET generally needs to be large enough to cope with a case where multiple users are activated. This will lead to the waste of resources. Moreover, multiple users in the CORESET cannot dynamically coordinate resources, which will easily cause resource fragments.

3. The DCI Itself Leads to a Waste of Resources.

A new radio (NR) access technology has a more complicated DCI design than the long term evolution (LTE), some parameters in the DCI design of the NR are strongly associated, and a maximum number of bits need to be reserved. For example, the BWP indication will affect a number of bits for a resource allocation, and the resource allocation needs to reserve bits according to a BWP with a maximum number of resource blocks (RBs); a resource allocation type will also affects the number of bits for the resource allocation, and the resource allocation needs to reserve bits according to the resource allocation (RA) type with largest overheads; an uplink transmission rank indication (TRI) will affect a number of bits of DMRS configuration parameters, which needs to be considered according to the largest TRI; and so on. These cases will also cause the waste of resources. With the evolution of 5G, it is increasingly common that control information is correlated, and it is difficult to support a dynamic size of the DCI, thereby causing a waste of overheads.

FIG. 1 illustrates a method for sending a control channel according to an embodiment. As shown in FIG. 1, the method according to the embodiment includes steps described below.

In step 1010, a sending end sends a first control channel using a first transmission configuration, and the first control channel carries first control information for indicating transmission configuration information of a data channel.

In step 1020, the sending end sends a second control channel using a second transmission configuration, and the second control channel carries second control information for indicating transmission configuration information of the data channel.

In this embodiment, the first control information and the second control information may be divided according to a preset rule, for example, may be divided in modes listed in table 1.

TABLE 1

| | |
|---|---|
| Mode one | Division according to importance (such as a target block error rate (BLER)) |
| Mode two | Division according to signaling action time |
| Mode three | Division according to the number of signaling action links |
| Mode four | Division according to a size change characteristic of signaling |
| Mode five | Division according to a usage (demodulation or non-demodulation) of the signaling |

In the present disclosure, different control information is sent using different control channels with different transmission configurations, so that the control information can be distinguished and thus different transmission configurations are adopted, which can improve the resource utilization rate and ensure the data transmission performance.

In this embodiment, the first control information and the second control information may be used for jointly indicating the same transmission configuration information or used for indicating different transmission configuration information.

In an embodiment, the first control channel L1 further carries third control information, and the third control information includes at least one of: pilot trigger information, feedback trigger information, BWP configuration information, transmission configuration indication (TCI) information, or configuration information of the second control channel L2. In this embodiment, these are only examples, and the third control information may also include other information.

In an embodiment, contents in the first control information belong to a same DCI format, contents in the third control information belong to a same DCI format, and the third control information and the first control information belong to a same DCI format or respectively adopt different DCI formats.

In an embodiment, the second transmission configuration is determined according to at least one of the first transmission configuration or the third control information.

The second transmission configuration includes an aggregation level selection range of the second control channel L2, transmit power of the second control channel L2, a position of the second control channel L2, a blind detection search space of the second control channel L2, an MCS of the second control channel L2, a rate matching parameter of the second control channel L2, a mapping parameter of the second control channel L2, a number of sub-blocks of the second control information carried on the second control channel L2, a number of transmission layers of the second control channel L2, a number of DMRS ports of the second control channel L2, a DMRS port allocation of the second control channel L2, a multiplexing mode of the second control channel L2 and the data channel, etc.

In an embodiment, the aggregation level selection range of the second control channel L2 is determined according to at least one of: an aggregation level of the first control channel, indication information carried in the third control information, or a modulation and coding scheme of the data channel.

Mode one: The aggregation level selection range of the second control channel L2 is determined according to one of the aggregation level used by the first control channel L1, the indication information carried in the third control information, or the aggregation level used by the first control channel L1 and the indication information carried in the third control information.

The aggregation level of the first control channel L1 is associated with the aggregation level of the second control channel L2. For example, the aggregation level of the second control channel L2 or a number of information bits of the second control channel L2 is less than or equal to the aggregation level of the first control channel L1 or a number of information bits of the first control channel L1.

The aggregation level of the second control channel L2 may also be directly notified through the third control information, for example, the aggregation level of the second control channel L2 is AL=8. Alternatively, an aggregation level range, for example, the aggregation level range AL=[8, 16] of the second control channel L2 is notified, then a terminal determines whether the aggregation level of the second control channel L2 is 8 or 16 through a blind detection.

Mode two: The aggregation level selection range of the second control channel L2 is determined according to the modulation and coding scheme of the data channel.

The modulation and coding scheme of the data channel corresponds to the aggregation level selection range of the second control channel L2.

In an embodiment, whether the second control channel L2 exists or not is determined by a DCI format sent by the first control channel L1. For example, control signaling for a downlink data transmission is sent through the first control channel L1 and the second control channel L2; and control signaling for an uplink data transmission is sent only through the first control channel L1, without the second control channel L2. It may also be determined according to a DCI format to be transmitted. For example, a DCI format 1_0 and a DCI format 0_0 are sent through the first control channel L1 and the second control channel L2, and a DCI format 1_1 and a DCI format 0_1 are sent only through the first control channel L1. This is only an example. Which DCI formats are sent through the first control channel L1 and which DCI formats are sent through the second control channel L2 may be configured as needed.

In an embodiment, the transmit power of the second control channel L2 is determined according to at least one of: transmit power of the first control channel or the indication information carried in the third control information.

For example, the transmit power of the second control channel L2 is determined according to the indication information carried in the third control information or the transmit power of the first control channel L1.

For example, it is agreed or configured an offset value between control information transmit power of the first control channel L1 and control information transmit power of the second control channel L2, for example, the transmit power of the second control channel L2 is 3 decibels (dB) lower than that of the first control channel L1.

For example, the third control information is used for indicating an offset of power of the second control channel L2 relative to power of the first control channel L1, or indicating an offset of the power of the second control channel L2 relative to transmit power of the data channel.

In an embodiment, the position of the second control channel L2 (in a case where no blind detection is needed) is determined according to at least one of: a position of the first control channel, a position of the data channel, the indication information carried in the third control information, precoding granularity of the data channel, a number of transmission layers of the data channel, or a number of transmit antenna ports of the data channel.

Multiple determination modes are described below.

Mode one: The position of the second control channel L2 is determined according to the position of the first control channel L1.

For example, the second control channel L2 is also located in a CORESET where the first control channel L1 is located.

For example, a time domain position of the second control channel L2 is in a $t^{th}$ time domain symbol after a time domain symbol where the first control channel L1 is located; where t is a natural number greater than or equal to 1 and may be agreed or configured by a base station.

For example, the time domain position of the second control channel L2 is in a $k^{th}$ time domain slot after a time domain slot where the first control channel L1 is located; where k is a natural number greater than or equal to 1 and may be agreed or configured by the base station.

Mode two: The position of the second control channel L2 is determined according to the position of the data channel.

For example, the time domain position of the second control channel L2 is in first x time domain symbols among symbols occupied by the data channel, where x=1, 2, . . . , N, and N is a total number of time domain symbols occupied by the data channel.

For example, a frequency domain position of the second control channel L2 is on a frequency domain resource allocated by the data channel, and is discretely mapped according to a preset mapping function F.

For another example, the second control channel L2 is located on a symbol where a demodulation pilot of the data channel is located; or the second control channel L2 is located at a position of one or more resource elements (REs) adjacent to the demodulation pilot.

Mode three: The position of the second control channel L2 is determined according to the indication information carried in the third control information.

A higher layer pre-configures multiple CORESETs for the transmission of the second control channel L2, and the third control information indicates a selected CORESET. Alternatively, the third control information indicates whether the second control channel L2 is transmitted in a control region or a data region. Alternatively, the third control information indicates a specific position, including a frequency or time domain position, at which the second control channel L2 is transmitted in the data region.

Mode four: The position of the second control channel L2 is jointly determined by the position of the first control channel L1 and the position of the data channel.

For example, the second control channel L2 is separated from the first control channel L1 by at least s symbols and the second control channel L2 is located at a time domain symbol where the data signal is located, x time domain symbols with lowest indexes and satisfying this condition are needed, where x=1, 2, . . . , N, and N is the total number of time domain symbols occupied by the data channel. For another example, the second control channel L2 is located after the time domain symbol where the first control channel L1 is located and before the time domain symbol where the data channel is located.

Mode five: The position of the second control channel L2 is determined according to the precoding granularity of the data channel.

For example, precoding granularity of an uplink data channel will affect the number of uplink transmitted precoding matrix indicators (TPMIs) and overheads of the second control information. When the second control channel L2 cannot carry all information about the TPMIs on one CORESET, the information will be divided into multiple sub-blocks and occupy resources of multiple CORESETs.

The number of sub-blocks required may be calculated according to the precoding granularity, a size of the CORESET, and the used aggregation level. Then, resources of corresponding CORESETs are enabled.

These sub-blocks may have independent cyclic redundancy checks (CRCs) or a joint CRC. For applications, such as sending multiple TPMIs, sending the second control information through multiple links, or sending the second control information in multiple slots, the independent CRCs may be used. For some other applications, the joint CRC may be used. Therefore, the independent CRCs or the joint CRC may be determined according to a division scheme of the first control information and the second control information.

When multiple sub-blocks are divided, each sub-block may carry block serial number information corresponding to this sub-block, or a correspondence between multiple sub-blocks and CORESETs may be pre-agreed.

In addition, if the number of sub-blocks is very large, a part of the sub-blocks may be transmitted within the CORESETs and a part of the sub-blocks may be transmitted on a symbol to which the data channel belongs. Alternatively, all sub-blocks are transmitted on the symbol to which the data channel belongs, which mainly depends on total overheads of the second control information.

Mode six: The position of the second control channel L2 is determined according to the number of transmission layers of the data channel.

For example, when the number of transmission layers is relatively small, the second control information does not need to be divided, but when the number of transmission layers is relatively large, different layers may correspond to different second control information, therefore, the second control information needs to be divided into blocks. In an embodiment, after the second control information is divided into multiple parts, these multiple parts may be transmitted on multiple CORESETs. Specific transmission positions need to be determined according to the corresponding number of transmission layers. Only one CORESET is required in a case of a small number of transmission layers, and multiple CORESETs are required in a case of a large number of transmission layers. A layer corresponding to each transmission block may correspond to one sub-block of the second control information and correspond to one CORESET for sending.

Mode seven: The position of the second control channel L2 is determined according to the number of transmit antenna ports of the data channel.

For example, if the number of transmit antenna ports is relatively small, the second control information does not need to be divided and correspond to the transmission of one CORESET. However, when the number of transmit antenna ports is relatively large, the second control information needs to be divided into multiple sub-blocks, and these multiple sub-blocks correspond to the transmission of multiple CORESET, or these multiple sub-blocks are transmitted on the symbol where the data channel is located.

The position of the second control channel may be determined according to a division rule of the first control information and the second control information. Different division rules correspond to different positions of the second control channel L2. For some division rules, the second control channel L2 and the first control channel L1 may both be located in a sending region of the control channel. In some cases, the second control channel L2 may be sent on a time domain symbol of the transmission of the data channel.

In an embodiment, if the blind detection is needed, the position of the second control channel L2 is correspondingly expanded to a set of candidate resource positions. The blind detection search space of the second control channel L2 (in the case where the blind detection is needed) is determined according to at least one of: the position of the first control channel, the position of the data channel, the indication information carried in the third control information, the precoding granularity of the data channel, the number of transmission layers of the data channel, or the number of transmit antenna ports of the data channel.

Mode one: The blind detection search space of the second control channel L2 is determined according to the position of the first control channel L1. For example, a time domain position of the blind detection search space of the second control channel L2 is in a $t^{th}$ time domain symbol after the time domain symbol where the first control channel L1 is located. For another example, the time domain position of the blind detection search space of the second control channel L2 is in the $t^{th}$ time domain symbol and a $(t+1)^{th}$ time domain symbol after the time domain symbol where the first control channel L1 is located, where t is a natural number greater than or equal to 1 and may be agreed or configured by the base station. In another example, the blind detection search space of the second control channel L2 is also located in the CORESET where the first control channel L1 is located.

Mode two: The blind detection search space of the second control channel L2 is determined according to the position of the data channel. For example, the time domain position of the blind detection search space of the second control channel L2 is in the first x time domain symbols among the symbols occupied by the data channel, where x=1, 2, . . . , N, and N is the total number of time domain symbols occupied by the data channel. For another example, a frequency domain position of the blind detection search space of L2 is located on the frequency domain resource allocated by the data channel and is discretely mapped according to the mapping function F.

Mode three: The blind detection search space of the second control channel L2 is determined according to the indication information carried in the third control information. For example, the higher layer pre-configures multiple CORESETs as the blind detection search space of the second control channel L2, which is dynamically selected through the third control information. For another example, the third control information indicates whether the blind detection search space of the second control channel L2 is in the control region or the data region.

Mode four: The blind detection search space of the second control channel L2 is jointly determined by the position of the first control channel L1 and the position of the data channel. For example, the blind detection search space of the second control channel L2 is separated from the first control channel L1 by at least s symbols and the blind detection search space of the second control channel L2 is located on the time domain symbol where the data channel is located. x time domain symbols with lowest indexes and satisfying this condition are needed, where x=1, 2, . . . , and the maximum value of x is the total number of time domain symbols occupied by the data channel. For another example, the blind detection search space of the second control channel L2 is located after the time domain symbol where the first control channel L1 is located and before the time domain symbol where the data channel is located.

Mode five: The blind detection search space of the second control channel L2 is determined according to the precoding granularity of the data channel.

For example, the precoding granularity of the uplink data channel will affect the number of uplink transmitted precoding matrix indicators (TPMIs) and the overheads of the second control information. When the second control channel L2 cannot carry all information about the TPMIs on one CORESET, the information will be divided into multiple sub-blocks and occupy resources of multiple CORESETs.

The overheads of the second control information may be determined according to the precoding granularity, so as to determine the blind detection space of the second control channel according to the size of the overheads.

Mode six: The blind detection search space of the second control channel L2 is determined according to the number of transmission layers of the data channel.

The overheads or the number of sub-blocks of the second control information may be determined according to the number of transmission layers of the data channel, so as to determine the blind detection space of the second control channel according to the size of the overheads or the number of sub-blocks.

Mode seven: The blind detection search space of the second control channel L2 is determined according to the number of transmit antenna ports of the data channel.

The overheads or the number of sub-blocks of the second control information may be determined according to the number of transmit antenna ports of the data channel, so as to determine the blind detection space of the second control channel according to the size of the overheads or the number of sub-blocks.

In an embodiment, the MCS of the second control channel L2 is determined according to at least one of: an aggregation level of the first control channel, the modulation and coding scheme of the data channel, the precoding granularity of the data channel, the number of transmission layers of the data channel, or the number of transmit antenna ports of the data channel.

Mode one: The MCS of the second control channel L2 is determined according to the aggregation level of the first control channel L1. For example, different aggregation levels of the first control channel L1 will determine different candidate ranges of the MCS of the second control channel L2. For example, an aggregation level 1 of the first control channel L1 corresponds to an MCS set a selectable for the second control channel L2, an aggregation level 2 of the first control channel L1 corresponds to an MCS set b selectable for the second control channel L2, and an aggregation level 4 of the first control channel L1 corresponds to an MCS set c selectable for the second control channel L2. For another example, aggregation levels 1 and 2 of the first control channel L1 correspond to the MCS set a selectable for the second control channel L2, and aggregation levels 4 and 8 of the first control channel L1 correspond to the MCS set b selectable for the second control channel L2. In this embodiment, these are only examples, and a correspondence between the aggregation level of the first control channel L1 and the MCS of the second control channel L2 may be configured.

Mode two: The MCS of the second control channel L2 is determined according to the MCS of the data channel. For example, for downlink scheduling control signaling, there is a correspondence between the MCS of the data channel and a candidate range of the MCS of the second control channel L2, where the correspondence may be a fixed correspondence of MCS indexes, and the correspondence may be one-to-one, one-to-many, or many-to-one. For example, for a one-to-one correspondence, an MCS x1 of the second control channel L2 corresponds to an MCS y1 of the data channel, and an MCS x2 of the second control channel L2 corresponds to an MCS y2 of the data channel; for a one-to-many correspondence, the MCS x1 of the second control channel L2 corresponds to MCSs {y1, y2} of the data channel, and the MCS x2 of the second control channel L2 corresponds to MCSs {y3, y4} of the data channel; for a many-to-one correspondence, MCSs {x1, x2} of the second control channel L2 correspond to the MCS y1 of the data channel, and MCSs {x3, x4} of the second control channel L2 correspond to the MCS y2 of the data channel.

In this embodiment, the size and the position of the CORESET may be dynamically adjusted. In the related art, the resource allocation of the control channel depends on the blind detection, and in order to reduce the complexity, the resource allocation is generally not flexible enough. In this embodiment, the flexibility of the size and the position of the CORESET of the second control channel L2 will be significantly improved.

In an embodiment, the rate matching parameter of the second control channel L2 is determined according to at least one of: the indication information carried in the first control information or the indication information carried in the third control information. The first control information or the third control information will carry some indication signaling for rate matching of the second control channel L2, which can better avoid collisions between the control channel and other signals (such as pilots signals) and can better coordinate interference between neighboring beams, nodes or cells. In an embodiment, if the indication signaling is also used for rate matching of the data channel, the indication signaling may be carried in the first control information; and if the indication signaling is only used by the second control channel L2, the indication signaling may be carried in the third control information.

In an embodiment, the mapping parameter of the second control channel L2 is determined according to the indication information carried in the third control information. In an embodiment, the mapping parameter includes RE mapping, such as a mapping mode; and the mapping parameter includes mapping from a codeword stream to a layer such as a number of layers to which the codeword stream is mapped.

In an embodiment, the number of sub-blocks of the second control information carried on the second control channel L2 is determined according to at least one of: the indication information carried in the third control information, a number of codewords of the data channel, the precoding granularity of the data channel, the number of transmission layers of the data channel, or the number of transmit antenna ports of the data channel.

Mode one: The number of sub-blocks of the second control information carried on the second control channel L2 is determined according to the indication information carried in the third control information. In an embodiment, the second control information may include multiple sub-blocks, where the multiple sub-blocks are respectively used for different physical links; the multiple sub-blocks may also be used for multiple transmission layers of a same physical link; the multiple sub-blocks may also be used for multiple frequency domain resource sets of a same physical link; the multiple sub-blocks may also be used for multiple time domain slots of a same physical link; or the multiple sub-blocks may also be used for one of multiple physical links and multiple layers, multiple physical links and multiple slots, or multiple physical links and multiple frequency domain resource sets. The third control information may indicate the number of sub-blocks of the second control information, as well as the number of links, the number of layers, the number of slots, and so on, for which the sub-blocks are used.

Mode two: The number of sub-blocks of the second control information carried on the second control channel L2 is determined according to the number of codewords of the data channel. For example, the second control information may include multiple sub-blocks with a number the same as the number of codewords of the data channel; or the second control information may include multiple sub-blocks with a number, which have a one-to-many correspondence with the number of codewords of the data channel.

In an embodiment, the number of transmission layers of the second control channel L2 or the number of DMRS ports of the second control channel L2 is determined according to at least one of: the indication information carried in the first control information or the indication information carried in the third control information. Mode one: the number of transmission layers or the number of DMRS ports of the second control channel L2 is determined according to the indication information carried in the first control information, for example, the number of transmission layers or the number of DMRS ports is the same as the number of codeword streams of the data channel. Mode two: the number of transmission layers or the number of DMRS ports of the second control channel L2 is determined according to the indication information carried in the third control information, and generally needs to be less than or equal to the number of DMRSs or the number of layers of the data channel.

In an embodiment, the DMRS port of the second control channel L2 is determined according to at least one of: the indication information carried in the first control information or the indication information carried in the third control information.

For example, the DMRS port of the second control channel L2 is determined according to the indication information carried in the first control information. For example, a subset of DMRS ports corresponding to a codeword stream with a higher MCS order of the data channel may be a port with a minimum or maximum port serial number, or a combination of multiple ports. For example, the DMRS port of the second control channel L2 is determined according to the indication information carried in the third control information. For example, the third control information indicates the DMRS port allocation of the second control channel L2, and may indicate one of the DMRS ports corresponding to the codeword stream with the higher MCS order of the data channel.

In an embodiment, the multiplexing mode of the second control channel L2 and the data channel is determined according to the indication information carried in the third control information. In an embodiment, the multiplexing mode includes space division, time division, frequency division, as well as time division and frequency division.

In an embodiment, one of a size of the second control information, a DCI format of the second control information, a BWP to which the second control information belongs, or a component carrier (CC) to which the second control information belongs is determined according to at least one of: the indication information carried in the third control information or the second control channel L2. For example, one of these is determined according to the position of the second control channel, and the corresponding size, DCI Format, belonging BWP or belonging CC may be agreed for a respective position.

In this embodiment, the resource of the second control channel L2 may be flexibly changed, and the size of the second control information carried on the second control channel L2 may also be indicated through the first control information, thereby avoiding the waste of overheads.

Figure 2:
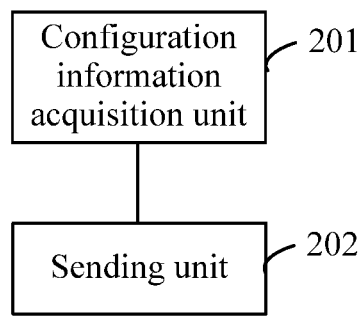
FIG. 2 is a block diagram of an apparatus for sending a control channel according to an embodiment.

FIG. 2 illustrates an apparatus for sending a control channel according to an embodiment. As shown in FIG. 2, the apparatus according to the embodiment includes a configuration information acquisition unit 201 and a sending unit 202. The configuration information acquisition unit 201 is configured to acquire a first transmission configuration and a second transmission configuration. The sending unit 202 is configured to send a first control channel using the first transmission configuration, and send a second control channel using the second transmission configuration; where the first control channel carries first control information for indicating transmission configuration information of a data channel; and the second control channel carries second control information for indicating transmission configuration information of the data channel.

In an embodiment, the first control channel further carries third control information, and the third control information includes at least one of: pilot trigger information, feedback trigger information, bandwidth part configuration information, transmission configuration indication information, or configuration information of the second control channel.

In an embodiment, the second transmission configuration acquired by the configuration information acquisition unit 201 is determined according to at least one of the first transmission configuration or the third control information.

In an embodiment, the second transmission configuration includes an aggregation level selection range of the second control channel, and the aggregation level selection range of the second control channel is determined according to at least one of: an aggregation level of the first control channel, indication information carried in the third control information, or a modulation and coding scheme of the data channel.

In an embodiment, the second transmission configuration includes transmit power of the second control channel, and the transmit power of the second control channel is determined according to at least one of: transmit power of the first control channel or the indication information carried in the third control information.

In an embodiment, the second transmission configuration includes a position of the second control channel or a blind detection search space of the second control channel, and the position or the blind detection search space of the second control channel is determined according to at least one of: a position of the first control channel, a position of the data channel, the indication information carried in the third control information, precoding granularity of the data channel, a number of transmission layers of the data channel, or the number of transmit antenna ports of the data channel.

In an embodiment, the second transmission configuration includes a modulation and coding scheme of the second control channel, and the modulation and coding scheme of the second control channel is determined according to at least one of: an aggregation level of the first control channel, the modulation and coding scheme of the data channel, the precoding granularity of the data channel, the number of transmission layers of the data channel, or the number of transmit antenna ports of the data channel.

In an embodiment, the second transmission configuration includes a rate matching parameter of the second control channel, and the rate matching parameter of the second control channel is determined according to at least one of: indication information carried in the first control information or the indication information carried in the third control information.

In an embodiment, the second transmission configuration includes a mapping parameter of the second control channel, and the mapping parameter of the second control channel is determined according to the indication information carried in the third control information.

In an embodiment, the second transmission configuration includes a number of sub-blocks of the second control information carried on the second control channel, and the number of sub-blocks of the second control information carried on the second control channel is determined according to at least one of: the indication information carried in the third control information, a number of codewords of the data channel, the precoding granularity of the data channel, the number of transmission layers of the data channel, or the number of transmit antenna ports of the data channel.

In an embodiment, the second transmission configuration includes a number of transmission layers of the second control channel, the number of demodulation reference signal ports of the second control channel, or a demodulation reference signal port of the second control channel, and the number of transmission layers of the second control channel, the number of demodulation reference signal ports of the second control channel, or the demodulation reference signal port of the second control channel is determined according to at least one of: the indication information carried in the first control information or the indication information carried in the third control information.

In an embodiment, the second transmission configuration includes a multiplexing mode of the second control channel and the data channel, and the multiplexing mode of the second control channel and the data channel is determined according to the indication information carried in the third control information.

In an embodiment, one of a size or a downlink control information format of the second control information, a bandwidth part to which the second control information belongs, or a component carrier to which the second control information belongs is determined according to at least one of: the indication information carried in the third control information or the position of the second control channel.

Figure 3:
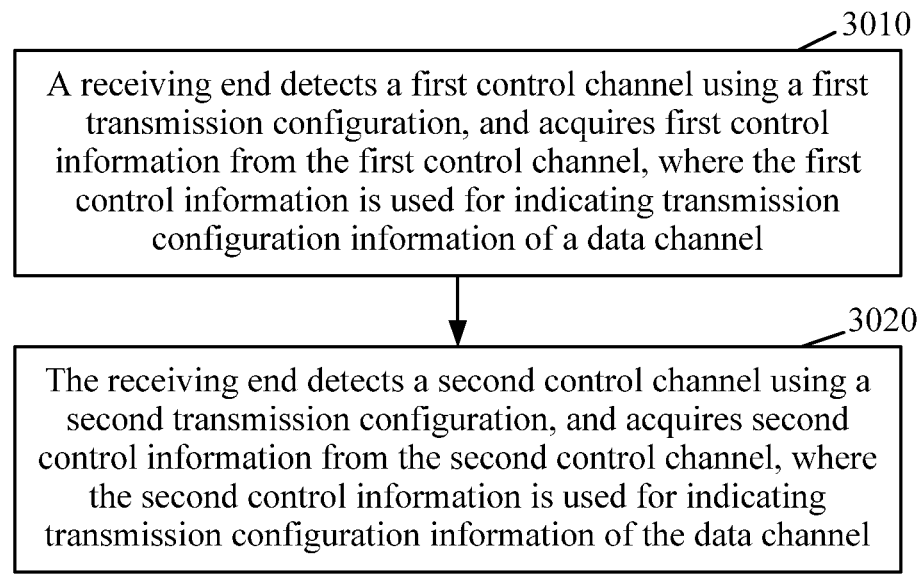
FIG. 3 is a flowchart of a method for detecting a control channel according to an embodiment.

FIG. 3 illustrates a method for detecting a control channel according to an embodiment. As shown in FIG. 3, the method for detecting the control channel according to the embodiment includes steps described below.

In step 3010, a receiving end detects a first control channel using a first transmission configuration, and acquires first control information from the first control channel, where the first control information is used for indicating transmission configuration information of a data channel.

In step 3020, the receiving end detects a second control channel using a second transmission configuration, and acquires second control information from the second control channel, where the second control information is used for indicating transmission configuration information of the data channel.

In an embodiment, the receiving end further acquires third control information from the first control channel, and the third control information includes at least one of: pilot trigger information, feedback trigger information, bandwidth part configuration information, transmission configuration indication information, or configuration information of the second control channel.

In an embodiment, before the receiving end detects the second control channel using the second transmission configuration, the method further includes that the receiving end determines the second transmission configuration according to at least one of the first transmission configuration or the third control information.

In an embodiment, the second transmission configuration includes an aggregation level selection range of the second control channel, and the aggregation level selection range of the second control channel is determined according to at least one of: an aggregation level of the first control channel, indication information carried in the third control information or a modulation and coding scheme of the data channel.

In an embodiment, the second transmission configuration includes a position of the second control channel or a blind detection search space of the second control channel, and the position or the blind detection search space of the second control channel is determined according to at least one of: a position of the first control channel, a position of the data channel, the indication information carried in the third control information, precoding granularity of the data channel, a number of transmission layers of the data channel, or a number of transmit antenna ports of the data channel.

In an embodiment, the second transmission configuration includes a modulation and coding scheme of the second control channel, and the modulation and coding scheme of the second control channel is determined according to at least one of: an aggregation level of the first control channel, the modulation and coding scheme of the data channel, the precoding granularity of the data channel, the number of transmission layers of the data channel, or the number of transmit antenna ports of the data channel.

In an embodiment, the second transmission configuration includes a rate matching parameter of the second control channel, and the rate matching parameter of the second control channel is determined according to at least one of: indication information carried in the first control information or the indication information carried in the third control information.

In an embodiment, the second transmission configuration includes a mapping parameter of the second control channel, and the mapping parameter of the second control channel is determined according to the indication information carried in the third control information.

In an embodiment, the second transmission configuration includes a number of sub-blocks of the second control information carried on the second control channel, and the number of sub-blocks of the second control information carried on the second control channel is determined according to at least one of: the indication information carried in the third control information, a number of codewords of the data channel, the precoding granularity of the data channel, the number of transmission layers of the data channel, or the number of transmit antenna ports of the data channel.

In an embodiment, the second transmission configuration includes: a number of transmission layers of the second control channel, the number of demodulation reference signal ports of the second control channel, or a demodulation reference signal port of the second control channel of the second control channel, and the number of transmission layers of the second control channel, the number of demodulation reference signal ports of the second control channel, or the demodulation reference signal port of the second control channel is determined according to at least one of: the indication information carried in the first control information or the indication information carried in the third control information.

In an embodiment, the second transmission configuration includes a multiplexing mode of the second control channel and the data channel, and the multiplexing mode of the second control channel and the data channel is determined according to the indication information carried in the third control information.

In an embodiment, one of a size of the second control information, a downlink control information format of the second control information, a bandwidth part to which the second control information belongs, or a component carrier to which the second control information belongs is determined according to at least one of: the indication information carried in the third control information or the position of the second control channel.

Figure 4:
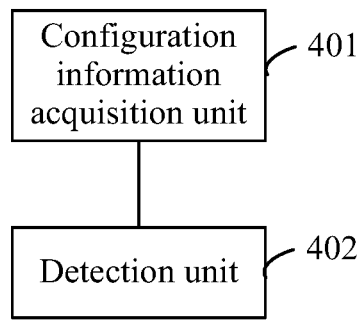
FIG. 4 is a block diagram of an apparatus for detecting a control channel according to an embodiment.

FIG. 4 illustrates an apparatus for detecting a control channel according to an embodiment. As shown in FIG. 4, the apparatus for detecting the control channel according to the embodiment includes a configuration information acquisition unit 401 and a detection unit 402. The configuration information acquisition unit 401 is configured to acquire a first transmission configuration and a second transmission configuration. The detection unit 402 is configured to detect a first control channel using the first transmission configuration, acquire first control information from the first control channel, detect a second control channel using the second transmission configuration, and acquire second control information from the second control channel; where the first control information indicates transmission configuration information of a data channel, and the second control information indicates transmission configuration information of the data channel.

In an embodiment, the configuration information acquisition unit 401 is further configured to acquire third control information from the first control channel, and the third control information includes at least one of: pilot trigger information, feedback trigger information, bandwidth part configuration information, transmission configuration indication information, or configuration information of the second control channel.

In an embodiment, the configuration information acquisition unit 401 is configured to acquire the second transmission configuration in a following manner: the second transmission configuration is determined according to at least one of the first transmission configuration or the third control information.

In an embodiment, the second transmission configuration includes at least one of: an aggregation level selection range of the second control channel, a position or a blind detection search space of the second control channel, a modulation and coding scheme of the second control channel, a rate matching parameter of the second control channel, a mapping parameter of the second control channel, the number of sub-blocks of the second control information carried on the second control channel, a number of transmission layers of the second control channel, the number of demodulation reference signal ports of the second control channel, a demodulation reference signal port of the second control channel, or a multiplexing mode of the second control channel and the data channel.

Reference is made to method embodiments for how to determine the preceding information in the second transmission configuration, which will not be repeated here.

Figure 5:
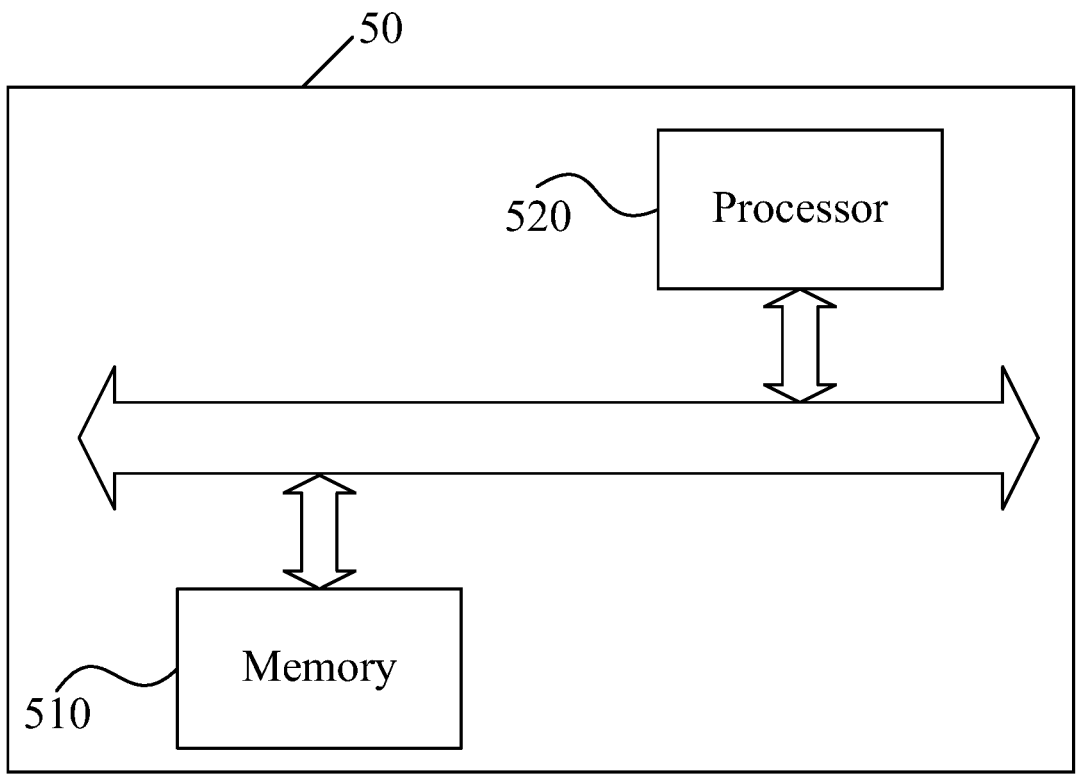
FIG. 5 is a block diagram of a device for sending a control channel according to an embodiment.

FIG. 5 illustrates a device for sending a control channel according to an embodiment. As shown in FIG. 5, the apparatus 50 for sending the control channel according to the embodiment includes a memory 510 and a processor 520, the memory 510 stores a program which, when read and executed by the processor 520, performs following operations: sending a first control channel using a first transmission configuration, and sending a second control channel using a second transmission configuration; where the first control channel carries first control information for indicating transmission configuration information of a data channel; and the second control channel carries second control information for indicating transmission configuration information of the data channel.

In another embodiment, the program, when read and executed by the processor 520, further implements the method for sending the control channel according to any one of the embodiments described above.

This embodiment provides a computer-readable storage medium. The computer-readable storage medium stores at least one program executable by at least one processor to implement the method for sending the control channel according to any one of the embodiments described above.

Figure 6:
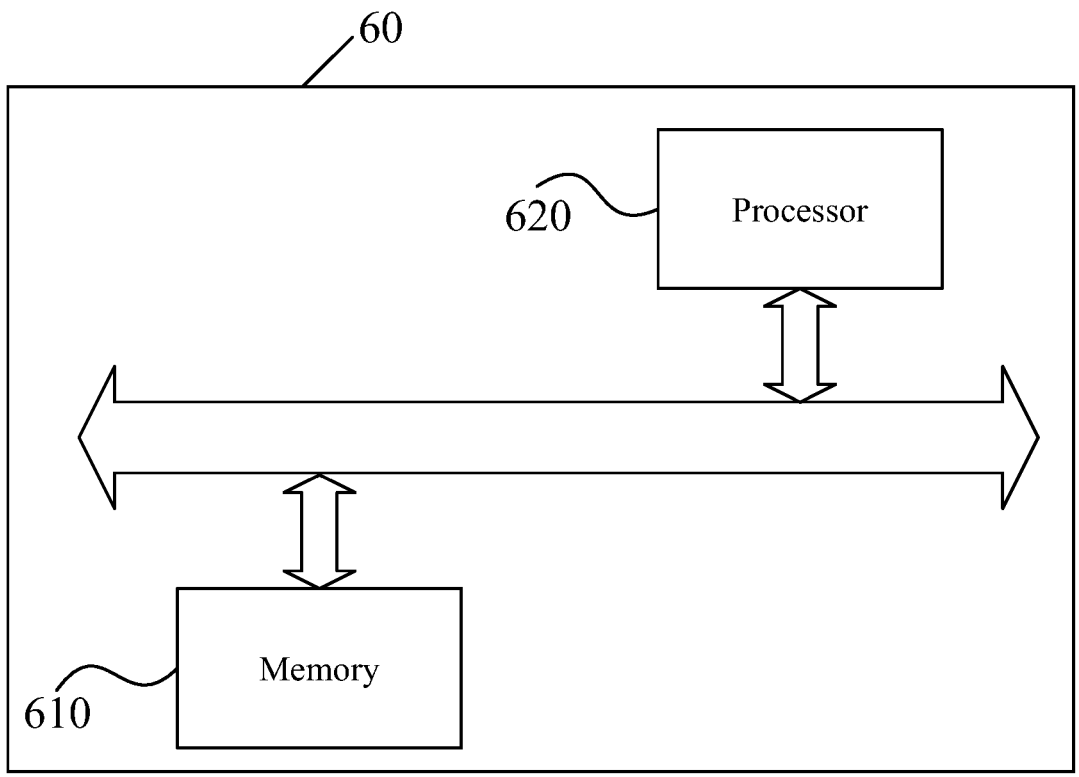
FIG. 6 is a block diagram of a device for detecting a control channel according to an embodiment.

FIG. 6 illustrates a device for detecting a control channel according to an embodiment. As shown in FIG. 6, the device 60 for detecting the control channel according to the embodiment includes a memory 610 and a processor 620, and the memory 610 stores a program which, when read and executed by the processor 620, implements the method for detecting the control channel according to any one of the embodiments described above.

This embodiment provides a computer-readable storage medium. The computer-readable storage medium stores at least one program executable by at least one processor to implement the method for detecting the control channel according to any one of the embodiments described above.

The computer-readable storage medium includes at least one medium capable of storing program codes, such as a USB flash disk, a read-only memory (ROM), a random access memory (RAM), a mobile hard disk, a magnetic disk or an optical disk.

What is claimed is:
1. A method for sending a control channel, comprising:
sending, by a sending end, a first control channel using a first transmission configuration, wherein the first con- trol channel carries first control information for indicating transmission configuration information of a data channel; and sending, by the sending end, a second control channel using a second transmission configuration, wherein the second control channel carries second control information for indicating transmission configuration information of the data channel;

wherein the first control channel further carries third control information, and the third control information comprises at least one of: pilot trigger information, feedback trigger information, bandwidth part configuration information, transmission configuration indication information, or configuration information of the second control channel;

wherein the second transmission configuration is determined according to at least one of the first transmission configuration or the third control information; or the second transmission configuration comprises an aggregation level selection range of the second control channel, and the aggregation level selection range of the second control channel is determined according to at least one of: an aggregation level of the first control channel, indication information carried in the third control information or a modulation and coding scheme of the data channel; or the second transmission configuration comprises a position of the second control channel or a blind detection search space of the second control channel, and the position of the second control channel or the blind detection search space of the second control channel is determined according to at least one of: a position of the first control channel, a position of the data channel, indication information carried in the third control information, precoding granularity of the data channel, a number of transmission layers of the data channel, or a number of transmit antenna ports of the data channel; or the second transmission configuration comprises a modulation and coding scheme of the second control channel, and the modulation and coding scheme of the second control channel is determined according to at least one of: an aggregation level of the first control channel, a modulation and coding scheme of the data channel, precoding granularity of the data channel, a number of transmission layers of the data channel, or a number of transmit antenna ports of the data channel; or the second transmission configuration comprises a rate matching parameter of the second control channel, and the rate matching parameter of the second control channel is determined according to at least one of: indication information carried in the first control information or indication information carried in the third control information; or the second transmission configuration comprises a number of sub-blocks of the second control information carried on the second control channel, and the number of sub-blocks of the second control information carried on the second control channel is determined according to at least one of: indication information carried in the third control information, a number of codewords of the data channel, precoding granularity of the data channel, a number of transmission layers of the data channel, or a number of transmit antenna ports of the data channel; or the second transmission configuration comprises a number of transmission layers of the second control channel, a number of demodulation reference signal ports of the second control channel, or a demodulation reference signal port of the second control channel, and the number of transmission layers of the second control channel, the number of demodulation reference signal ports of the second control channel, or the demodulation reference signal port of the second control channel is determined according to at least one of: indication information carried in the first control information or indication information carried in the third control information.

2. The method of claim 1, wherein contents in the first control information belong to a same downlink control information format, or contents in the third control information belong to a same downlink control information format.

3. The method of claim 1, wherein the second transmission configuration comprises transmit power of the second control channel, and the transmit power of the second control channel is determined according to at least one of: transmit power of the first control channel or indication information carried in the third control information.

4. The method of claim 1, wherein the second transmission configuration comprises a mapping parameter of the second control channel, and the mapping parameter of the second control channel is determined according to indication information carried in the third control information.

5. The method of claim 1, wherein the second transmission configuration comprises a multiplexing mode of the second control channel and the data channel, and the multiplexing mode of the second control channel and the data channel is determined according to indication information carried in the third control information.

6. The method of claim 1, wherein one of a size of the second control information, a downlink control information format of the second control information, a bandwidth part to which the second control information belongs, or a component carrier to which the second control information belongs is determined according to at least one of: indication information carried in the third control information or a position of the second control channel.

7. A device for sending a control channel, comprising a memory and a processor, wherein the memory stores a program which, when read and executed by the processor, implements the method for sending the control channel of claim 1.

8. A computer-readable storage medium, storing at least one program executable by at least one processor to implement the method for sending the control channel of claim 1.

9. An apparatus for sending a control channel, comprising:

a configuration information acquisition unit, configured to acquire a first transmission configuration and a second transmission configuration; and a sending unit, configured to send a first control channel using the first transmission configuration, and send a second control channel using the second transmission configuration; wherein the first control channel carries first control information for indicating transmission configuration information of a data channel; and the second control channel carries second control information for indicating transmission configuration information of the data channel;

wherein the first control channel further carries third control information, and the third control information comprises at least one of: pilot trigger information, feedback trigger information, bandwidth part configuration information, transmission configuration indication information, or configuration information of the second control channel;

wherein the second transmission configuration is determined according to at least one of the first transmission configuration or the third control information; or the second transmission configuration comprises an aggregation level selection range of the second control channel, and the aggregation level selection range of the second control channel is determined according to at least one of: an aggregation level of the first control channel, indication information carried in the third control information or a modulation and coding scheme of the data channel; or the second transmission configuration comprises a position of the second control channel or a blind detection search space of the second control channel, and the position of the second control channel or the blind detection search space of the second control channel is determined according to at least one of: a position of the first control channel, a position of the data channel, indication information carried in the third control information, precoding granularity of the data channel, a number of transmission layers of the data channel, or a number of transmit antenna ports of the data channel; or the second transmission configuration comprises a modulation and coding scheme of the second control channel, and the modulation and coding scheme of the second control channel is determined according to at least one of: an aggregation level of the first control channel, a modulation and coding scheme of the data channel, precoding granularity of the data channel, a number of transmission layers of the data channel, or a number of transmit antenna ports of the data channel; or the second transmission configuration comprises a rate matching parameter of the second control channel, and the rate matching parameter of the second control channel is determined according to at least one of: indication information carried in the first control information or indication information carried in the third control information; or the second transmission configuration comprises a number of sub-blocks of the second control information carried on the second control channel, and the number of sub-blocks of the second control information carried on the second control channel is determined according to at least one of: indication information carried in the third control information, a number of codewords of the data channel, precoding granularity of the data channel, a number of transmission layers of the data channel, or a number of transmit antenna ports of the data channel; or the second transmission configuration comprises a number of transmission layers of the second control channel, a number of demodulation reference signal ports of the second control channel, or a demodulation reference signal port of the second control channel, and the number of transmission layers of the second control channel, the number of demodulation reference signal ports of the second control channel, or the demodulation reference signal port of the second control channel is determined according to at least one of: indication information carried in the first control information or indication information carried in the third control information.

10. A method for detecting a control channel, comprising:

detecting, by a receiving end, a first control channel using a first transmission configuration, and acquiring first control information from the first control channel, wherein the first control information indicates transmission configuration information of a data channel;

detecting, by the receiving end, a second control channel using a second transmission configuration, and acquiring second control information from the second control channel, wherein the second control information indicates transmission configuration information of the data channel; and acquiring, by the receiving end, third control information from the first control channel, wherein the third control information comprises at least one of: pilot trigger information, feedback trigger information, bandwidth part configuration information, transmission configuration indication information, or configuration information of the second control channel;

wherein the second transmission configuration is determined according to at least one of the first transmission configuration or the third control information; or the second transmission configuration comprises an aggregation level selection range of the second control channel, and the aggregation level selection range of the second control channel is determined according to at least one of: an aggregation level of the first control channel, indication information carried in the third control information or a modulation and coding scheme of the data channel; or the second transmission configuration comprises a position of the second control channel or a blind detection search space of the second control channel, and the position of the second control channel or the blind detection search space of the second control channel is determined according to at least one of: a position of the first control channel, a position of the data channel, indication information carried in the third control information, precoding granularity of the data channel, a number of transmission layers of the data channel, or a number of transmit antenna ports of the data channel; or the second transmission configuration comprises a modulation and coding scheme of the second control channel, and the modulation and coding scheme of the second control channel is determined according to at least one of: an aggregation level of the first control channel, a modulation and coding scheme of the data channel, precoding granularity of the data channel, a number of transmission layers of the data channel, or a number of transmit antenna ports of the data channel; or the second transmission configuration comprises a rate matching parameter of the second control channel, and the rate matching parameter of the second control channel is determined according to at least one of: indication information carried in the first control information or indication information carried in the third control information; or the second transmission configuration comprises a number of sub-blocks of the second control information carried on the second control channel, and the number of sub-blocks of the second control information carried on the second control channel is determined according to at least one of: indication information carried in the third control information, a number of codewords of the data channel, precoding granularity of the data channel, a number of transmission layers of the data channel, or a number of transmit antenna ports of the data channel; or the second transmission configuration comprises a number of transmission layers of the second control channel, a number of demodulation reference signal ports of the second control channel, or a demodulation reference signal port of the second control channel, and the number of transmission layers of the second control channel, the number of demodulation reference signal ports of the second control channel, or the demodulation reference signal port of the second control channel is determined according to at least one of: indication information carried in the first control information or indication information carried in the third control information.

11. The method of claim 10, before detecting, by the receiving end, the second control channel using the second transmission configuration, further comprising:

determining, by the receiving end, the second transmission configuration according to the at least one of the first transmission configuration or the third control information in a case where the second transmission configuration is determined according to the at least one of the first transmission configuration or the third control information.

12. An apparatus for detecting a control channel, applied to the method for detecting the control channel of claim 10, comprising:

a configuration information acquisition unit, configured to acquire a first transmission configuration and a second transmission configuration; and a detection unit, configured to detect a first control channel using the first transmission configuration, acquire first control information from the first control channel, detect a second control channel using the second transmission configuration, and acquire second control information from the second control channel; wherein the first control information indicates transmission configuration information of a data channel, and the second control information indicates transmission configuration information of the data channel;

wherein the configuration information acquisition unit is further configured to acquire third control information from the first control channel, and the third control information comprises at least one of: pilot trigger information, feedback trigger information, bandwidth part configuration information, transmission configuration indication information, or configuration information of the second control channel;

wherein the second transmission configuration is determined according to at least one of the first transmission configuration or the third control information; or the second transmission configuration comprises an aggregation level selection range of the second control channel, and the aggregation level selection range of the second control channel is determined according to at least one of: an aggregation level of the first control channel, indication information carried in the third control information or a modulation and coding scheme of the data channel; or the second transmission configuration comprises a position of the second control channel or a blind detection search space of the second control channel, and the position of the second control channel or the blind detection search space of the second control channel is determined according to at least one of: a position of the first control channel, a position of the data channel, indication information carried in the third control information, precoding granularity of the data channel, a number of transmission layers of the data channel, or a number of transmit antenna ports of the data channel; or the second transmission configuration comprises a modulation and coding scheme of the second control channel, and the modulation and coding scheme of the second control channel is determined according to at least one of: an aggregation level of the first control channel, a modulation and coding scheme of the data channel, precoding granularity of the data channel, a number of transmission layers of the data channel, or a number of transmit antenna ports of the data channel; or the second transmission configuration comprises a rate matching parameter of the second control channel, and the rate matching parameter of the second control channel is determined according to at least one of: indication information carried in the first control information or indication information carried in the third control information; or the second transmission configuration comprises a number of sub-blocks of the second control information carried on the second control channel, and the number of sub-blocks of the second control information carried on the second control channel is determined according to at least one of: indication information carried in the third control information, a number of codewords of the data channel, precoding granularity of the data channel, a number of transmission layers of the data channel, or a number of transmit antenna ports of the data channel; or the second transmission configuration comprises a number of transmission layers of the second control channel, a number of demodulation reference signal ports of the second control channel, or a demodulation reference signal port of the second control channel, and the number of transmission layers of the second control channel, the number of demodulation reference signal ports of the second control channel, or the demodulation reference signal port of the second control channel is determined according to at least one of: indication information carried in the first control information or indication information carried in the third control information.

13. A device for detecting a control channel, comprising a memory and a processor, wherein the memory stores a program which, when read and executed by the processor, implements the method for detecting the control channel of claim 10.

* * * * *